United States Patent
Chen et al.

(10) Patent No.: US 7,932,631 B2
(45) Date of Patent: Apr. 26, 2011

(54) POWER ALLOCATING APPARATUS

(75) Inventors: Chih-Tai Chen, Taipei County (TW); Yi-Chiao Hsu, Taipei County (TW)

(73) Assignees: Silitek Electronic (Guangzhou) Co., Ltd., Guangzhou (CN); Lite-On Technology Corp., Taipei (TW)

( * ) Notice: Subject to any disclaimer, the term of this patent is extended or adjusted under 35 U.S.C. 154(b) by 215 days.

(21) Appl. No.: 12/262,196

(22) Filed: Oct. 31, 2008

(65) Prior Publication Data
US 2010/0109433 A1    May 6, 2010

(51) Int. Cl.
*H02J 1/10* (2006.01)
(52) U.S. Cl. .............. 307/29; 307/45; 307/80; 307/85; 307/86; 307/113
(58) Field of Classification Search .......... 307/29, 307/44, 45, 80, 85, 86, 113
See application file for complete search history.

(56) References Cited

U.S. PATENT DOCUMENTS 7,046,040 B2 *  5/2006  Guedon ................ 326/88
7,180,208 B2 *  2/2007  Chen et al. ............ 307/116

* cited by examiner

*Primary Examiner* — Hal I Kaplan
(74) *Attorney, Agent, or Firm* — Kile Goekjian Reed & McManus PLLC

(57) ABSTRACT

A power allocating apparatus has a plurality of power supply modules coupled to a plurality of loads via a plurality of power lines, respectively. The power allocating apparatus includes a first switch element and a control device. The first switch element has a first connecting terminal and a second connecting terminal coupled to an output terminal of a power supply module with a relatively high power conversion rate and an output terminal of a power supply module with a second power conversion rate, respectively, and selectively allocates a power generated by the power supply module with the relatively high power conversion rate to a predetermined number of loadings simultaneously according to on or off states of the first switch element. The control device is coupled to the first switch element to control the first switch element to enter an on state or an off state.

14 Claims, 7 Drawing Sheets

Testing : 115Vac/60Hz, Po=320W

| Power \ Loading condition | 20% (Po=64W) | 50% (Po=160W) | 100% (Po=320W) |
|---|---|---|---|
| Total power of conventional switching power supply | 75.05W | 181.2W | 372.88W |
| Total power of the power allocating apparatus 200 | 74.45W | 180.4W | 371.55W |
| The power saved by the present power supply ($\Delta P = P_{in1} - P_{in2}$) | 0.6W | 0.8W | 1.33W |

FIG. 7

POWER ALLOCATING APPARATUS

BACKGROUND OF THE INVENTION

1. Field of the Invention

The present invention relates to a power allocating apparatus, and more particularly, to a power allocating apparatus that allocates power of a plurality of power supply modules.

2. Description of the Prior Art

Energy saving is a prescient topic. To conserve energy, all electronic equipments have respective standard power conversion rates according to the regulations given by the U.S. environment protection agency (EPA). For example, the power conversion rate of the power supply of a personal computer sold in the U.S. has to be higher than 80 percent. In a conventional computer system, the configuration of a switching power supply includes a main power supply and an auxiliary power supply as shown in FIG. 1. FIG. 1 is a diagram illustrating the configuration of a conventional switching power supply 100. The conventional switching power supply 100 comprises a main power device 102 and an auxiliary power device 104, wherein the main power device 102 is utilized for providing a first current $I_{o1}$ and a first voltage $V_{o1}$ for a main power load 106, and the auxiliary power device 104 is utilized for providing a second current $I_{o2}$ and a second voltage $V_{o2}$ for an auxiliary power load 108. When the computer system is under a normal operation mode, the main power device 102 provides the first current $I_{o1}$ and the first voltage $V_{o1}$ to the main power load 106, while the auxiliary power device 104 provides the second current $I_{o2}$ and the second voltage $V_{o2}$ to the auxiliary power load 108; when the computer is under a sleep mode, the main power device 102 does not provide the first current Io, and the first voltage $V_{o1}$ to the main power load 106, while the auxiliary power device 104 continues to provide the second current $I_{o2}$ and the second voltage $V_{o2}$ to the auxiliary power load 108 to maintain the basic operation of the computer system. In other words, the auxiliary power device 104 is always on. However, in comparison with the output power of the main power device 102, the auxiliary power device 104 has a relatively low output power (i.e., the second current $I_{o2}$ and the second voltage $V_{o2}$). For example, the output power of the auxiliary power device 104 may only be 10-20 W (watt). Therefore, for the purpose of saving costs, the conventional auxiliary power device 104 is always implemented by a power supply having a relatively low power conversion rate. For example, when the conventional auxiliary power device 104 operates under a heavy load, the power conversion rate is merely 78 percent. Since the main power consumed by the power system is provided by the main power device 102, the conventional main power device 102 is implemented by the power supply having a relatively high power conversion rate. Furthermore, when the conventional computer system operates under the normal operation mode, the main power device 102 and the auxiliary power device 104 provide power to, respectively, the main power load 106 and the auxiliary power load 108 at the same time, therefore the entire power conversion rate of the switching power supply may be affected by the auxiliary power device 104 having the relatively low power conversion rate. In other words, the entire power conversion rate of the switching power supply may be decreased as a result of the low power conversion rate of the auxiliary power device 104. Consequently, the power conversion rate of the conventional switching power supply may not conform to the specifications regulated by the EPA under the normal operation mode (higher than 80 percent). Therefore, to increase the power conversion rate of the power supply device of the computer is an urgent problem in the field of power supply.

SUMMARY OF THE INVENTION

One of the objectives of the present invention is therefore to provide a power allocating apparatus that allocates power of a plurality of power supply modules.

According to an embodiment of the present invention, a power allocating apparatus applied in a plurality of power supply modules is disclosed, wherein the plurality of power supply modules are coupled to a plurality of loads via a plurality of power lines, respectively. The power allocating apparatus comprises a first switch element, and a control device. The first switch element has a first connecting terminal and a second connecting terminal coupled to an output terminal of a power supply module with a relatively high power conversion rate and an output terminal of a power supply module with a relatively low power conversion rate, respectively, and selectively allocates a power generated by the power supply module with a relatively high power conversion rate to a predetermined number of loadings simultaneously according to on or off states of the first switch element. The control device is coupled to the first switch element for generating the control signal to control the first switch element to enter an on state or an off state.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 7 is a diagram illustrating a total power comparing table of the first embodiment power allocating apparatus and the above-mentioned conventional switching power supply operated under the normal operation mode.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
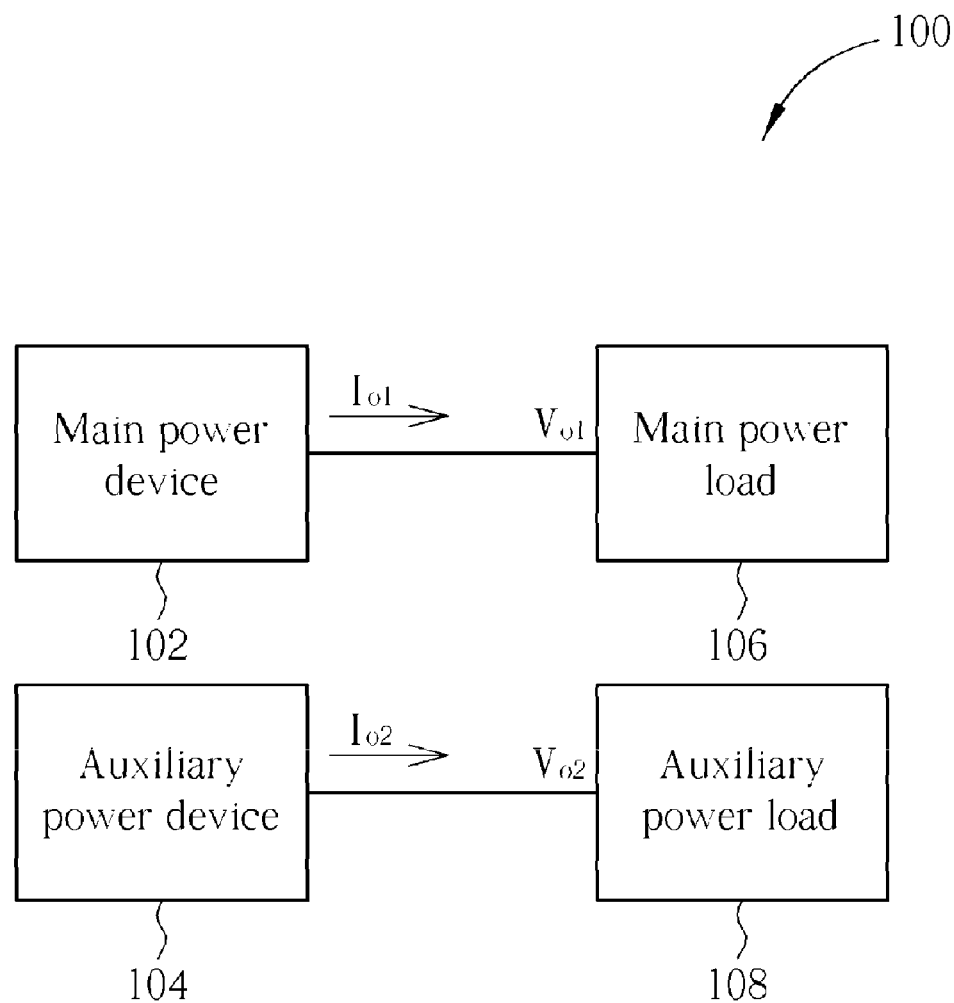
FIG. 1 is a diagram illustrating the configuration of a conventional switching power supply.
Figure 2:
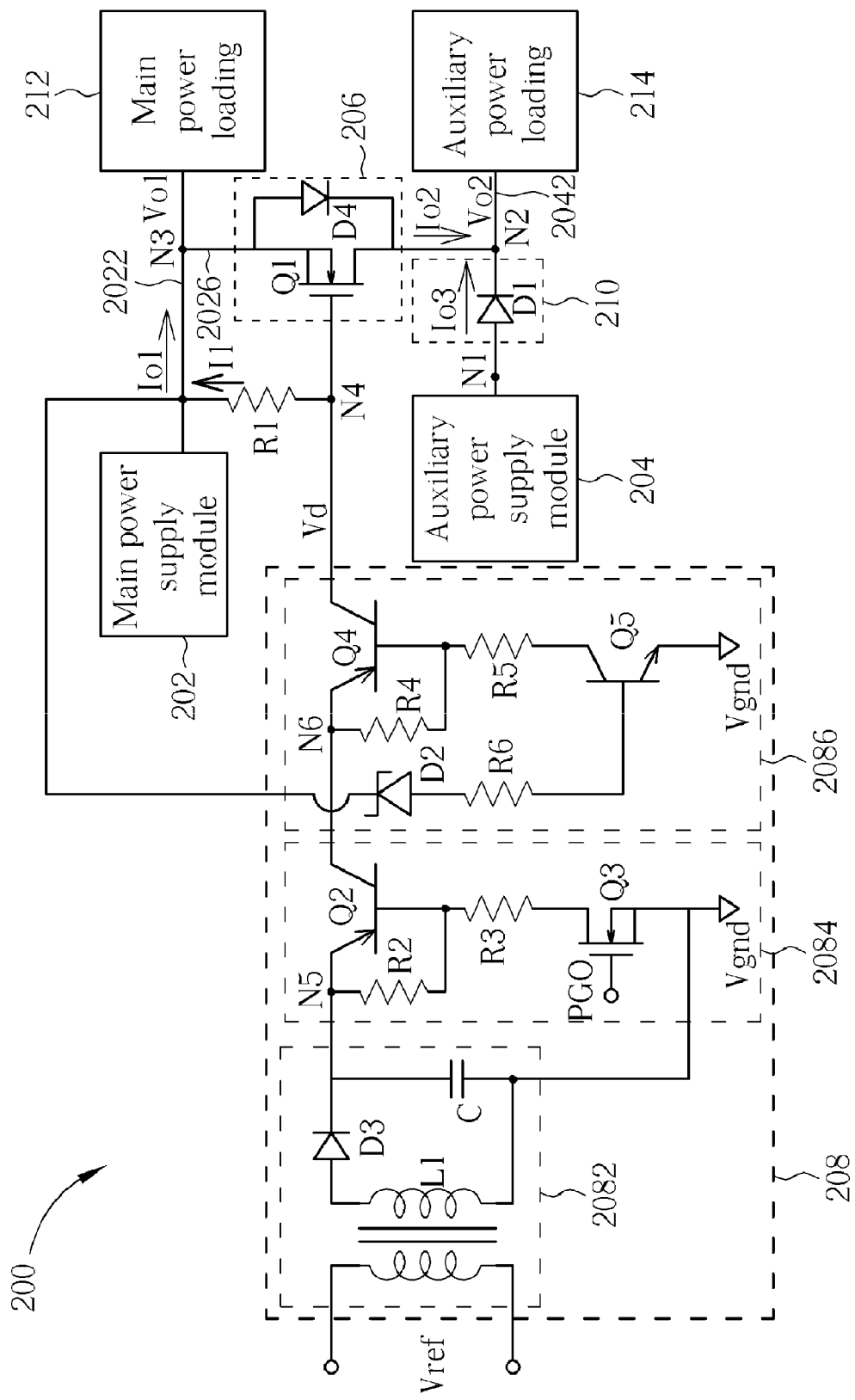
FIG. 2 is a diagram illustrating a power allocating apparatus according to an embodiment of the present invention.

Please refer to FIG. 2. FIG. 2 is a diagram illustrating a power allocating apparatus 200 according to an embodiment of the present invention. The power allocating apparatus 200 comprises a main power supply module 202, an auxiliary power supply module 204, a first switching element 206 installed between the main power supply module 202 and the auxiliary power supply module 204, a controlling device 208 for controlling the first switching element 206, and a second switching element 210 installed between the auxiliary power supply module 204 and an auxiliary power loading 214.

A first power line 2022 is electrically coupled between the main power supply module 202 and a main power loading 212 for transferring power, while a second power line 2042 is electrically coupled between the auxiliary power supply module 204 and an auxiliary power supply loading 214 for transferring power.

The second switching element 210 is coupled between an output terminal N1 of the auxiliary power supply module 204 and a terminal N2 for selectively switching off the supplying power of the auxiliary power supply module 204 to the auxiliary power loading 214 (i.e., opening the path between the auxiliary power supply module 204 and the auxiliary power loading 214). Furthermore, in order to selectively allocate an output current Io1 of the main power supply module 202 to the main power loading 212 and the auxiliary power supply loading 214 at the same time, an additional third power line 2026 is installed between an output terminal N3 of the first power line 2022 and the terminal N2 of the second power line 2042, and the first switching element 206 is further installed on the third power line 2026.

When the first switching element 206 is turned on (i.e., shorted), the second switching element 210 is turned off (i.e., opened) for generating a current having a unitary direction between the output terminal N1 and the terminal N2. In other words, the second switching element 210 is an unidirectional switch and may be implemented by a diode in one of the embodiments of the present invention as shown in FIG. 2, in which a diode D1 is applied as the second switching element 210. The diode D1 has an anode coupled to the output terminal N1 of the auxiliary power supply module 204 and a cathode coupled to the terminal N2 of the first switching element 206.

The first switching element 206 is a bidirectional switch, which is implemented by an N type field effect transistor Q1 in this embodiment. The N type field effect transistor Q1 has a source terminal coupled to an output terminal N3 of the main power supply module 202, a source terminal coupled to the cathode (i.e., terminal N2) of the diode D1, and a gate terminal N4 coupled to the controlling device 208, where the controlling device 208 outputs a control voltage Vd to the gate terminal N4 to selectively allocate the output current Io1 of the main power supply module 202 to the main power loading 212 and the auxiliary power loading 214 at the same time. Please note that, although the first switching element 206 is implemented by the N type field effect transistor Q1 in this embodiment, this is not meant to be a limitation of the present invention. In other words, any switching elements having the characteristic of selectively shorting or opening the path between the output terminal N3 and the terminal N2 belong within the scope of the present invention. For example, in another embodiment of the present invention, the first switching element 206 may be implemented by a P type field effect transistor, a bipolar junction transistor (BJT) or a relay, etc.

The main power supply module 202 outputs an output voltage Vo1, and the auxiliary power supply module 204 outputs an output voltage Vo2, wherein the output voltage Vo1 is designed to be higher than the output voltage Vo2 for turning on the N type field effect transistor Q1. Accordingly, when the N type field effect transistor Q1 is turned on, an output current Io2 may be divided from the output current Io1 of the main power supply module 202 and the output current Io2 may replace an output current Io3 generated by the auxiliary power supply module 204. Furthermore, the characteristic of unitary direction of the diode D1 allows the output current Io3 generated by the auxiliary power supply module 204 to be supplied to the auxiliary power loading 214 during a power off mode, and prevents the output current Io2 from flowing back to the auxiliary power supply module 204 during a normal mode. Meanwhile, during the power off mode, in order to prevent the output current Io3 generated by the auxiliary power supply module 204 from flowing to the main power supply module 202, the body terminal of the N type field effect transistor Q1 is coupled to its source terminal such that the N type field effect transistor Q1 is equivalently a body diode D4. Therefore, when the power allocating apparatus 200 operates under the power off mode, the equivalent body diode D4 prevents the output current I03 outputted from the auxiliary power supply module 204 from flowing to the main power supply module 202. If the output current Io3 flows back to the main power supply module 202 during the power off mode, it may lower the total power conversion rate of the power allocating apparatus 200, or generate an error operation of the power allocating apparatus 200.

Please refer to FIG. 2 again. The control device 208 of the power allocating apparatus 200 comprises a driving circuit 2082, a timing control circuit 2084, and a detecting circuit 2086. One of the purposes of the driving circuit 2082 is to generate the control voltage Vd, which is higher than the output voltage Vo1, to turn on the N type field effect transistor Q1, and any other driving circuits capable of generating the control voltage Vd that is higher than the output voltage Vo1 also belong within the scope of the present invention. For example, the driving circuit 2082 can be implemented as a boost driving circuit, a buck-boost driving circuit, or a flyback driving circuit. In the embodiment, the driving circuit 2082 comprises a transformer L1, a diode D3, and a capacitor C, wherein the transformer L1, which includes a power inductor, generates the control voltage Vd according to the duty-cycle of a pulse-width modulation (PWM) signal Vref. Since the operation of the driving circuit 2082 is well-known to those skilled in this art, further description is omitted here for brevity.

The timing control circuit 2084 is coupled to the driving circuit 2082 in this embodiment for controlling the driving circuit 2082. More specifically, the timing control circuit 2084 selectively outputs the control signal Vd generated by the driving circuit 2082 according to an output signal PGO generated by a power protection circuit, such as a house keeping IC, wherein the output signal PGO is a power good output signal. Please note that those skilled in this art may also use a power fault output signal generated by the house keeping IC to control the timing control circuit 2084 after some modifications are performed to the embodiment, and these modifications also belong within the scope of the present invention. The timing control circuit 2084 comprises a bipolar junction transistor Q2, a resistive element R2, a field effect transistor Q3, and a resistive element R3, wherein an emitter terminal of the bipolar junction transistor Q2 is coupled to an output terminal N5 of the driving circuit 2082, the resistive element R2 is coupled between the emitter terminal and a base terminal of the bipolar junction transistor Q2, the field effect transistor Q3 comprises a source terminal coupled to a ground voltage Vgnd, a gate terminal of the field effect transistor Q3 receives the output signal PGO, and the resistive element R3 is coupled between the base terminal of the bipolar junction transistor Q2 and a drain terminal of the field effect transistor Q3.

Furthermore, the detecting circuit 2086 comprises a bipolar junction transistor Q4, a resistive element R4, a bipolar junction transistor Q5, a resistive R5, a resistive R6, and a zener diode D2. The detecting circuit 2086 detects the output power of the main power supply module 202 to selectively output the control signal Vd outputted by the timing control circuit 2084 to the first switching element 206. The bipolar junction transistor Q4 has an emitter terminal coupled to an output terminal N6 of the timing control circuit 2084, the resistive element R4 is coupled between the emitter terminal (i.e., output terminal N6) and a base terminal of the bipolar junction transistor Q4, the bipolar junction transistor Q5 has an emitter terminal coupled to the ground voltage Vgnd, the resistive element R5 is coupled between a base terminal of the bipolar junction transistor Q4 and a collector terminal of the bipolar junction transistor Q5, a terminal of the resistive element R6 is coupled to a base terminal of the bipolar junction transistor Q5, and the zener diode D2 has an anode coupled to the other terminal of the resistive R6, and a cathode coupled to the output terminal N3 of the main power supply module 202.

Figure 3:
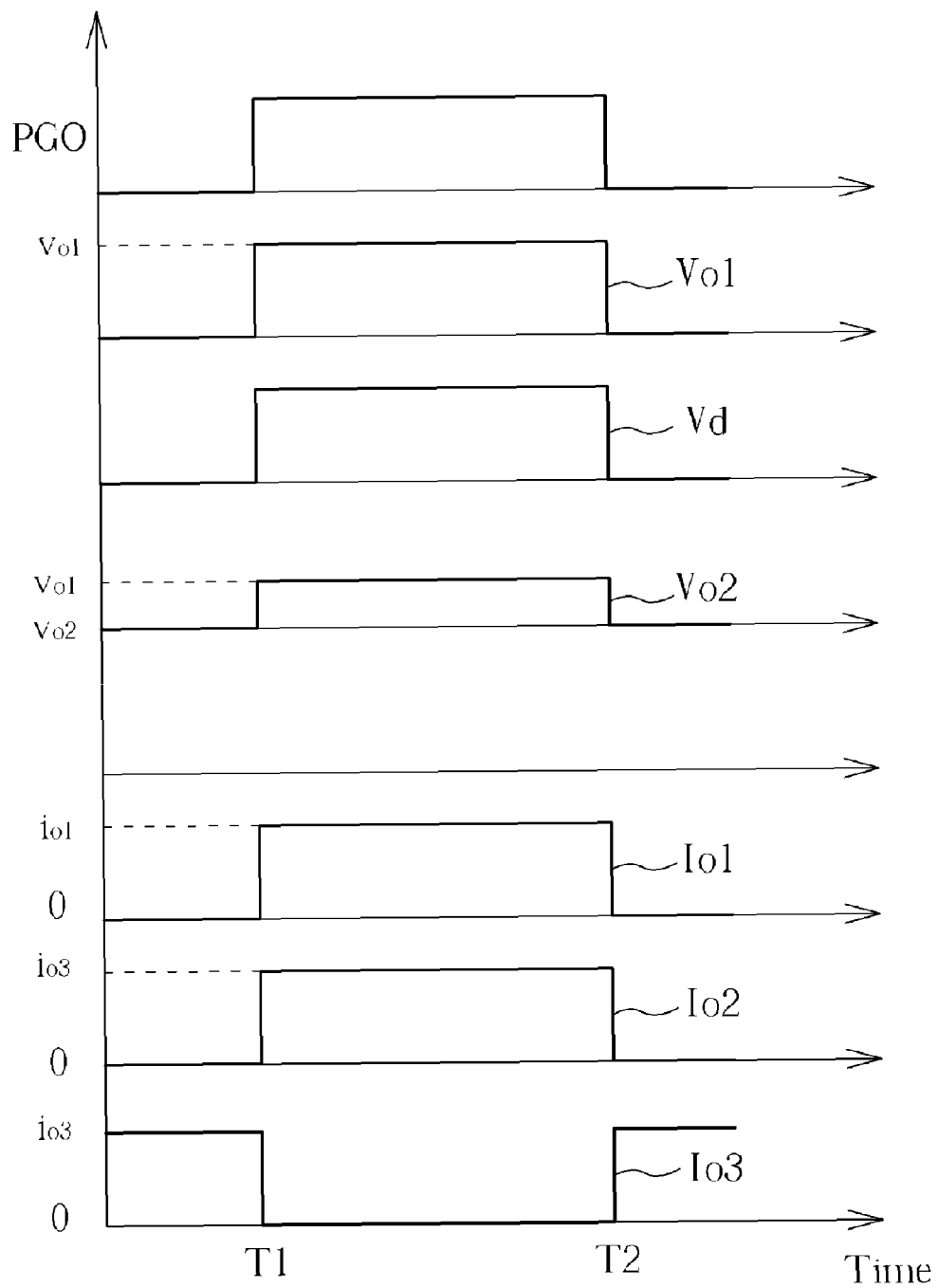
FIG. 3 is a timing diagram illustrating an output signal, an output voltage, a control voltage, and an output current of the power allocating apparatus as shown in FIG. 2.

Please refer to FIG. 3. FIG. 3 is a timing diagram illustrating the output signal PGO, the output voltage Vo1 the control voltage Vd, the output voltage Vo2, the output current Io1, the output current Io2, and the output current Io3 of the power allocating apparatus 200 as shown in FIG. 2. Please note that, in order to describe the spirit of the present invention more clearly, it is assumed that the voltage drop between the collector terminal and the emitter terminal of the bipolar junction transistor Q2 is approximately zero when the bipolar junction transistor Q2 is turned on in this embodiment as well as the bipolar junction transistor Q4. In order to describe the spirit of the present invention more clearly, the normal operation mode of the power allocating apparatus 200 is set between time T1 and time T2, while the power off mode is beyond time T1 and time T2 as shown in FIG. 3. Furthermore, in the time intervals beyond time T1 and time T2, the auxiliary power supply module 204 of the embodiment provides the output voltage Vo2 having a voltage level of $v_{o2}$ to the auxiliary power loading 214.

When the power allocating apparatus 200 operates under the normal operation mode, the main power supply module 202 generates the output voltage Vo1 having a voltage level of $v_{o1}$ to the main power loading 212. As shown in FIG. 3, when the output signal PGO turns on the field effect transistor Q3 at time T1, the bipolar junction transistor Q2 is also turned on as the resistive element R2 induces a voltage drop when a current is passed through the resistive element R2. Accordingly, the control voltage Vd generated by the driving circuit 2082 is passed to the output terminal N6. Under the normal operation mode, if the voltage level (i.e., voltage level of $v_{o1}$) of the output voltage Vo1 generated by the main power supply module 202 is high enough to break down the zener diode D2, i.e., the voltage drop of the zener diode D2 is higher than its break down voltage Vz, then the bipolar junction transistor Q5 may be turned on. Accordingly, the bipolar junction transistor Q4 can also be turned on as the resistive element R4 induces a voltage drop when a current is passed through the resistive element R4. Then, the control voltage Vd at the output terminal N6 is transmitted to the gate terminal N4 of the N type field effect transistor Q1. According to the embodiment of the present invention, the control voltage Vd generated by the driving circuit 2082 is higher than the voltage level $v_{o1}$ of the output voltage Vo1 and a resistive element R1 is installed between the gate terminal N4 and the output terminal N3 for inducing a current I1 to flow through the resistive element R1 under the normal operation mode in order to turn on the N type field effect transistor Q1 properly. Accordingly, the voltage drop of the resistive element R1 generated by the current I1 may turn on the N type field effect transistor Q1 at time T1, while the second switching element 210 is turned off (i.e., open). Therefore, the voltage level $v_{o2}$ of the output voltage Vo2 is increased to the same voltage level as the output voltage Vo1, i.e., the voltage level of $v_{o1}$, at time T1 as shown in FIG. 3. Please note that, in order to describe the spirit of the present invention more clearly, it is assumed that the transmitting time to transmit the control voltage Vd from the bipolar junction transistor Q2 to the gate terminal N4 via the bipolar junction transistor Q4 is approximately zero in the embodiment.

Since the voltage level $v_{o1}$ of the output voltage Vo1 is higher than the voltage level $v_{o2}$ of the output voltage Vo2, the current $i_{o1}$ of the output current Io1 generated by the main power supply module 202 is provided to the main power loading 212 and the auxiliary power loading 214 at the same time under the normal operation mode. Therefore, the output current Io3, which has the current of $i_{o3}$, generated by the auxiliary power supply module 204 may be replaced by the output current Io2 such that the output current Io3 outputted from the auxiliary power supply module 204 can be reduced to approximately zero while the current of the output current Io2 is increased to approximate $i_{o3}$, as shown in time T1 of FIG. 3.

Please refer to FIG. 3 again. When the output signal PGO generated by the house keeping IC is switched to a low level voltage at time T2, the power allocating apparatus 200 enters the power off mode, while the main power allocating apparatus 202 stops outputting the output voltage Vo1 having the voltage level of $v_{o1}$ to the main power loading 212. When the output signal PGO turns off the field effect transistor Q3 at time T2, and when the voltage level of the output voltage Vo1 is not higher than the break down voltage Vz of the zener diode D2, the bipolar junction transistor Q2 and the bipolar junction transistor Q4 are off such that the control voltage Vd is switched to a low voltage level and turns off the N type field effect transistor Q1. Therefore, the path between the output terminal N3 and the terminal N2 is open (i.e., non-conductive), the current $i_{o2}$ of the output current Io2 is changed to zero, and then the auxiliary power supply module 204 outputs the output voltage Vo2 having the voltage level of $v_{o2}$ and the output current Io3 having the current of $i_{o3}$ to the auxiliary power loading 214 under the power off mode, as shown at time T2 in FIG. 3.

To sum up, when the power allocating apparatus 200 operates under the normal operation mode, the powers supplied to the main power loading 212 and the auxiliary power loading 214 are provided by the main power supply module 202 having a relatively higher power conversion rate, while the auxiliary power supply module 204 having a relatively lower power conversion rate does not provide power. Therefore, the auxiliary power supply module 204 does not consume power during the normal operation mode. Compared to the above-mentioned conventional method, when the power allocating apparatus 200 of the present invention operates under the normal operation mode, the main power supply module 202 and the auxiliary power supply module 204 do not provide power to the main power loading 212 and the auxiliary power loading 214 at the same time, and only the powers required by the main power loading 212 and the auxiliary power loading 214 are provided by the main power supply module 202 at the same time. Furthermore, since the auxiliary power supply module 204 has the relatively low power conversion rate, the power off of the auxiliary power supply module 204 during the normal operation mode further improves the whole power conversion rate of the power allocating apparatus 200. When the power allocating apparatus 200 operates under the power off mode, the main power supply module 202 having the relatively high power conversion rate does not provide power, and the power required by the auxiliary power loading 214 can then be provided by the auxiliary power supply module 202 having the relatively low power conversion rate.

Accordingly, the whole power conversion rate of the power allocating apparatus 200 can be increased and is not affected by the auxiliary power supply module 204 having the relatively low power conversion rate. Please note that those skilled in this art will readily understand that the relatively high power conversion of the main power supply module 202 corresponds to the power conversion rate of a relatively high power, i.e., the relatively high power conversion is measured when the main power supply module 202 outputs the relatively high power. However, the power conversion rate of the main power supply module 202 is not maintained at a constant high conversion rate, especially when the main power supply module 202 outputs a relatively low power. Furthermore, since the power required by the auxiliary power loading 214 is much lower than that required by the main power loading 212, the auxiliary power supply module 204 of the power allocating apparatus 200 of the present invention resumes supplying power to the auxiliary power loading 214 during the power off mode but does not utilize the main power supply module 202 to generate a relatively low power for the auxiliary power loading 214.

Figure 4:
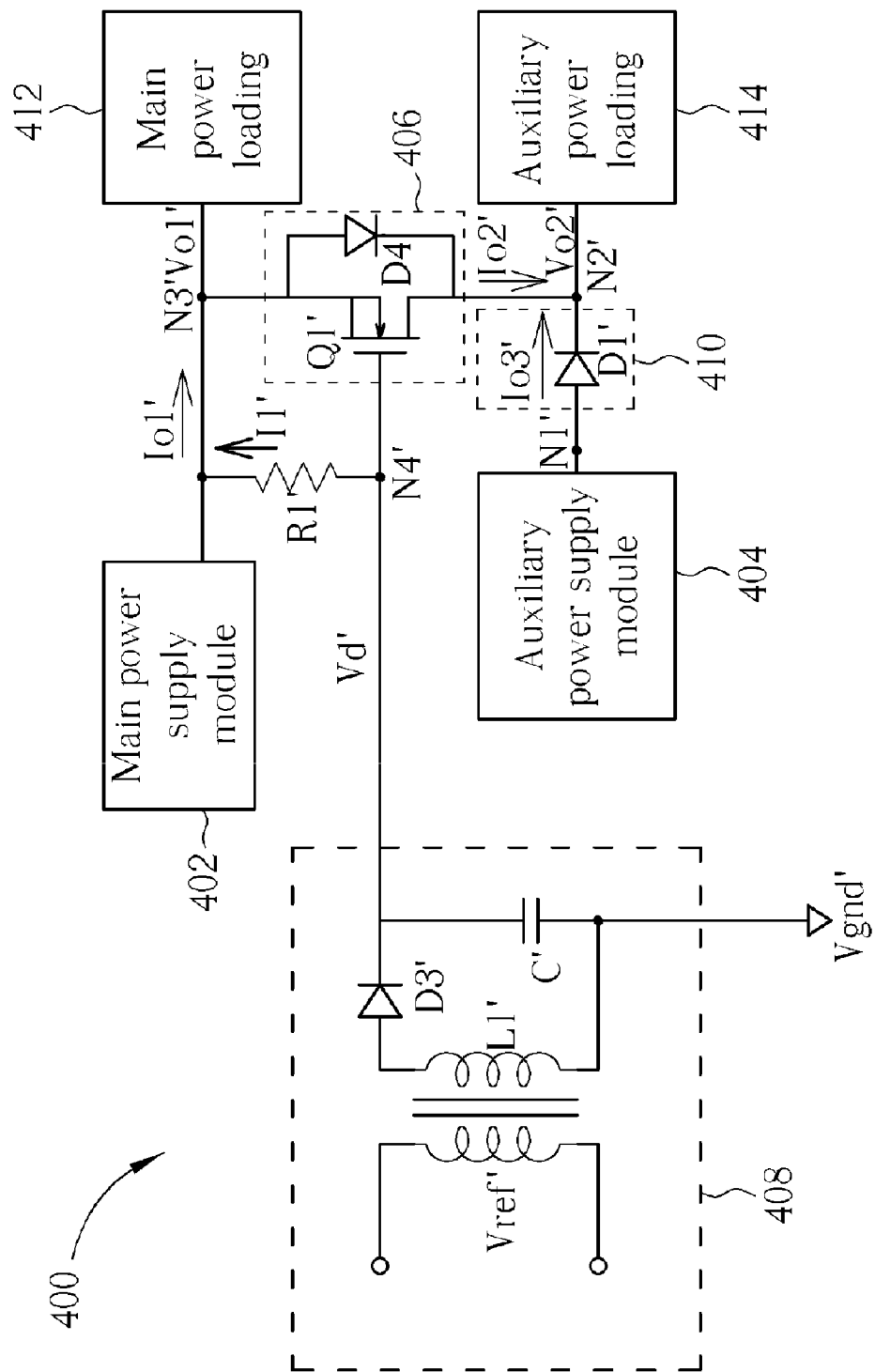
FIG. 4 is a diagram illustrating the power allocating apparatus according to a second embodiment of the present invention.

According to the embodiment shown in FIG. 2, the timing control circuit 2084 of the control device 208 has the purpose of selectively outputting the control signal Vd generated by the driving circuit 2082, and the detecting circuit 2086 has the purpose of detecting the power outputted from the main power supply module 202 to selectively output the control signal Vd outputted from the timing control circuit 2084 to the first switching element 206, therefore the timing control circuit 2084 and the detecting circuit 2086 in the controlling device 208 may be selectively eliminated according to practical requirements, which also belongs within the scope of the present invention. In other words, in another configuration where only the driving circuit 2082 is retained in the controlling device 208, the characteristics of supplying power to the main power loading 212 and the auxiliary power loading 214 by using the main power supply module 202 having the relatively high power conversion rate are still provided, as shown in FIG. 4. FIG. 4 is a diagram illustrating a power allocating apparatus 400 according to a second embodiment of the present invention. Compared to the power allocating apparatus 200 shown in FIG. 2, the second embodiment power allocating apparatus 400 does not comprise the timing control circuit 2084 and the detecting circuit 2086, while the controlling device 408 of the power allocating apparatus 400 is implemented as a driving circuit as shown in FIG. 4.

The power allocating apparatus 400 comprises a main power supply module 402, an auxiliary power supply module 404, a first switching element 406, a controlling device 408, and a second switching element 410, wherein the main power supply module 402 is coupled to a main power loading 412, and the auxiliary power supply module 404 is coupled to an auxiliary power loading 414. The second switching element 410 is an unidirectional switch and coupled between an output terminal N1' of the auxiliary power supply module 404 and a terminal N2'. The first switching element 406 is a bidirectional switch and implemented as an N type field effect transistor Q1', wherein its source terminal is coupled to an output terminal N3' of the main power supply module 402, and a drain terminal is coupled to the cathode (i.e., terminal N2') of the diode D1', and a gate terminal N4' is coupled to the controlling device 408. Therefore, an output current Io1' generated by the main power supply module 402 can be selectively allocated to the main power loading 412 and the auxiliary power loading 414 at the same time according to a control voltage Vd' generated by the controlling device 408. In other words, the timing of control voltage Vd' can be adjusted through the on/off operation of the controlling device 408 in this embodiment, where another detecting device may be utilized for detecting the output power of the main power supply module 402 to turn on/off the controlling device 408. More specifically, the operation of the power allocating apparatus 400 will be obvious to those skilled in this art after reading the disclosed operation relating to the power allocating apparatus 200 of FIG. 2, thus further description is omitted here for brevity.

Compared to the above-mentioned conventional method, when the power allocating apparatus 400 of the present invention operates under the normal operation mode, the main power supply module 402 and the auxiliary power supply module 404 do not provide power to the main power loading 412 and the auxiliary power loading 414 respectively at the same time, but the power required by the main power loading 412 and the auxiliary power loading 414 is only provided by the main power supply module 402 at the same time. Furthermore, since the auxiliary power supply module 404 has the relatively low power conversion rate, the power off of the auxiliary power supply module 404 during the normal operation mode further improves the whole power conversion rate of the power allocating apparatus 400. Accordingly, the whole power conversion rate of the power allocating apparatus 400 can be increased and is not be affected by the auxiliary power supply module 404 having the relatively low power conversion rate.

Figure 5:
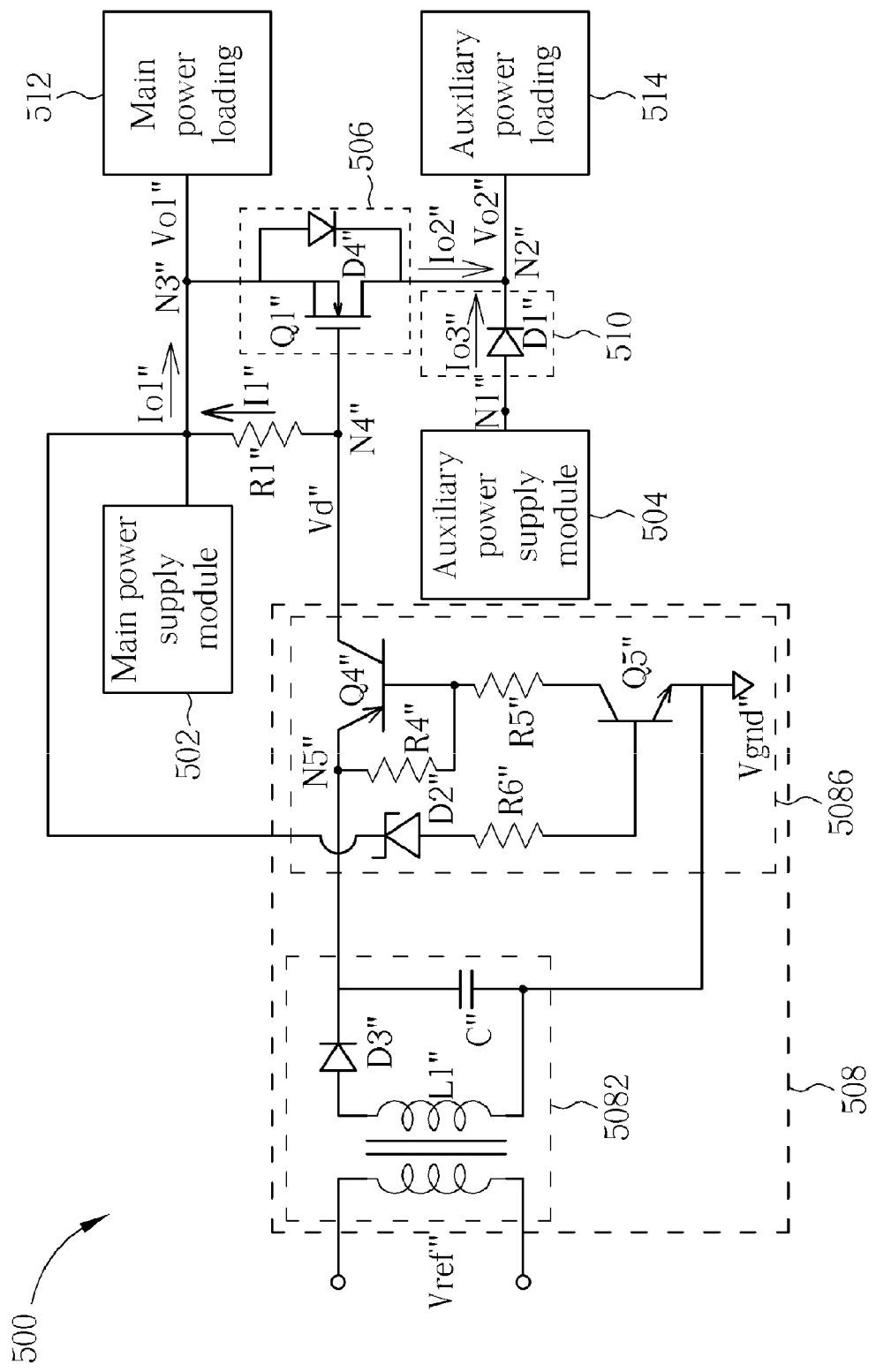
FIG. 5 is a diagram illustrating the power allocating apparatus according to a third embodiment of the present invention.

Please refer to FIG. 5. FIG. 5 is a diagram illustrating a power allocating apparatus 500 according to a third embodiment of the present invention. Compared to the power allocating apparatus 200 as shown in FIG. 2, the third embodiment power allocating apparatus 500 does not comprise the timing control circuit 2084, and the controlling device 508 of the power allocating apparatus 500 comprises a driving circuit 5082 and a detecting circuit 5086, as shown in FIG. 5. Similar to the embodiment power allocating apparatus 200 shown in FIG. 2, one purpose of the driving circuit 5082 is to provide a control voltage Vd" that is higher than the output voltage Vo1" for turning on the N type field effect transistor Q1". Furthermore, the main power supply module 502 generates an output voltage Vo1", the auxiliary power supply module 504 generates an output voltage Vo2", and the output voltage Vo1" is higher than the output voltage Vo1". Accordingly, when the N type field effect transistor Q1" is turned on, an output current Io2" may be divided from the output current Io1" of the main power supply module 502 and the output current Io2" may replace an output current Io3" generated by the auxiliary power supply module 504. A purpose of the detecting circuit 5086 is to detect the power outputted from the main power supply module 502 to selectively output the control signal Vd" outputted from the driving circuit 5082 to the first switching element 506, which is a bidirectional switch.

The power allocating apparatus 500 comprises a main power supply module 502, an auxiliary power supply module 504, a first switching element 506, a controlling device 508, and a second switching element 510, wherein the main power supply module 502 is coupled to a main power loading 512, and the auxiliary power supply module 504 is coupled to an auxiliary power loading 514. The second switching element 510 is an unidirectional switch and coupled between an output terminal N1" of the auxiliary power supply module 504 and a terminal N2".

Furthermore, the timing of the control voltage Vd" can be adjusted through the on/off operation of the controlling device 5082 in this embodiment. More specifically, the operation of the power allocating apparatus 500 will be obvious to those skilled in this art after reading the disclosed operation relating to the power allocating apparatus 200 of FIG. 2, thus further description is omitted here for brevity.

Compared to the above-mentioned conventional method, when the power allocating apparatus 500 of the present invention operates under the normal operation mode, the main power supply module 502 and the auxiliary power supply module 504 do not provide power to the main power loading 512 and the auxiliary power loading 514 at the same time, and the power required by the main power loading 512 and the auxiliary power loading 514 is only provided by the main power supply module 502. Furthermore, since the auxiliary power supply module 504 has the relatively low power conversion rate, the power off of the auxiliary power supply module 504 during the normal operation mode further improves the whole power conversion rate of the power allocating apparatus 500. Accordingly, the whole power conversion rate of the power allocating apparatus 500 can be increased and is not affected by the auxiliary power supply module 504 having the relatively low power conversion rate.

Figure 6:
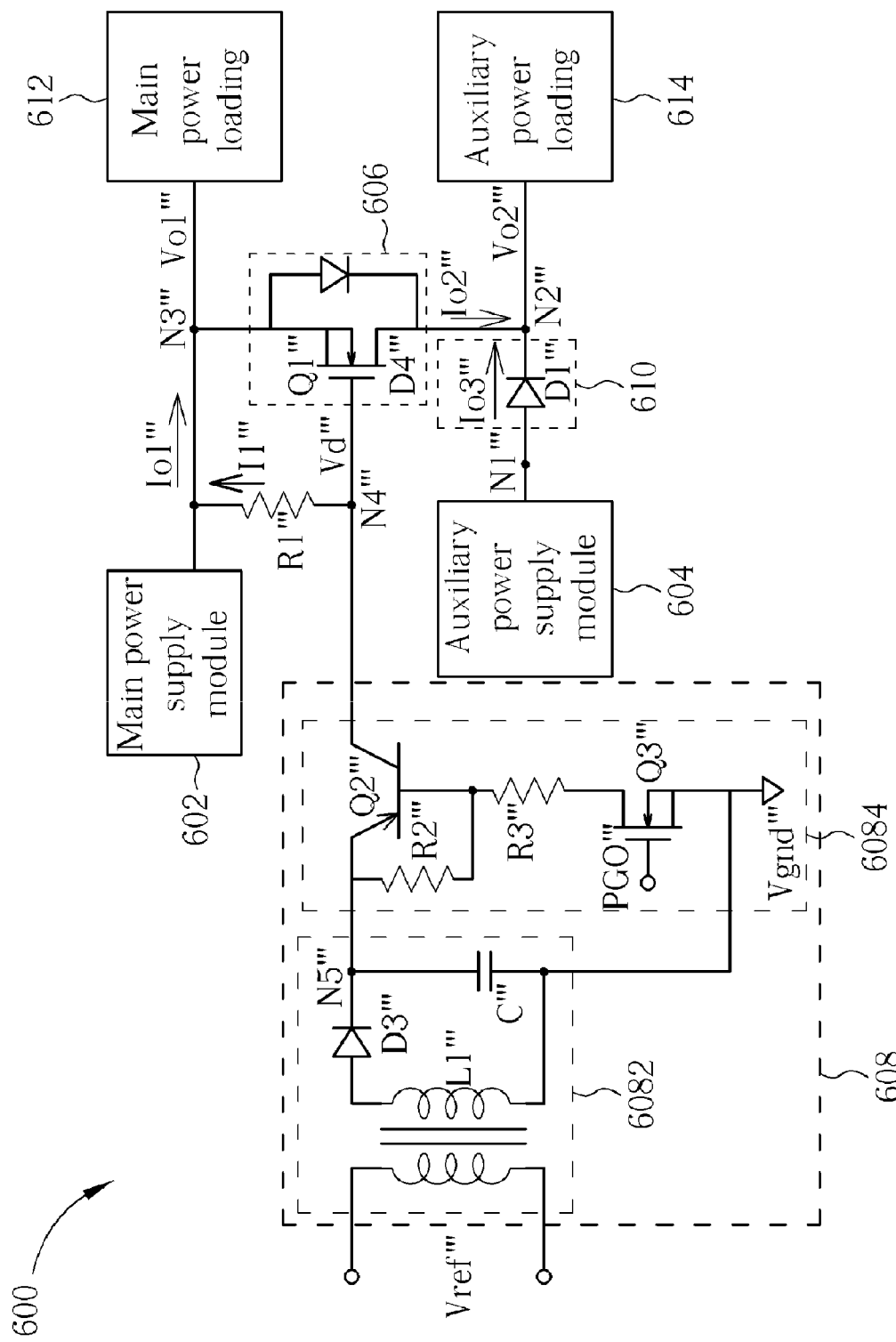
FIG. 6 is a diagram illustrating the power allocating apparatus according to a fourth embodiment of the present invention.

Please refer to FIG. 6. FIG. 6 is a diagram illustrating a power allocating apparatus 600 according to a third embodiment of the present invention. Compared to the power allocating apparatus 200 as shown in FIG. 2, the third embodiment power allocating apparatus 600 does not comprise the detecting circuit 2086, and the controlling device 608 of the power allocating apparatus 600 comprises a driving circuit 6082 and a detecting circuit 6084, as shown in FIG. 6. Similar to the embodiment power allocating apparatus 200 as shown in FIG. 2, one purpose of the driving circuit 6082 is to provide a control voltage Vd''' that is higher than the output voltage Vo1''' for turning on the N type field effect transistor Q1'''. Furthermore, the main power supply module 602 generates an output voltage Vo1''', the auxiliary power supply module 604 generates an output voltage Vo2''', and the output voltage Vo1''' is higher than the output voltage Vo2'''. Accordingly, when the N type field effect transistor Q1''' is turned on, an output current Io2''' may be divided from the output current Io1''' of the main power supply module 602 and the output current Io2''' may replace an output current Io3''' generated by the auxiliary power supply module 604.

The power allocating apparatus 600 comprises a main power supply module 602, an auxiliary power supply module 604, a first switching element 606, a controlling device 608, and a second switching element 610, wherein the main power supply module 602 is coupled to a main power loading 612, and the auxiliary power supply module 604 is coupled to an auxiliary power loading 614. The second switching element 610 is an unidirectional switch and coupled between an output terminal N1''' of the auxiliary power supply module 604 and a terminal N2'''. Please note that, the first switching element 606 is a bidirectional switch.

Furthermore, another detecting device may be utilized for detecting the output power of the main power supply module 602 to turn on/off the controlling device 6082. More specifically, the operation of the power allocating apparatus 600 will be obvious to those skilled in this art after reading the disclosed operation relating to the power allocating apparatus 200 of FIG. 2, thus further description is omitted here for brevity.

Compared to the above-mentioned conventional method, when the power allocating apparatus 600 of the present invention operates under the normal operation mode, the main power supply module 602 and the auxiliary power supply module 604 do not provide power to the main power loading 612 and the auxiliary power loading 614 respectively at the same time, and the power required by the main power loading 612 and the auxiliary power loading 614 is only provided by the main power supply module 602 Furthermore, since the auxiliary power supply module 604 has the relatively low power conversion rate, the power off of the auxiliary power supply module 604 during the normal operation mode further improves the whole power conversion rate of the power allocating apparatus 600. Accordingly, the whole power conversion rate of the power allocating apparatus 600 can be increased and is not affected by the auxiliary power supply module 604 having the relatively low power conversion rate.

Please refer to FIG. 7. FIG. 7 is a diagram illustrating a total power comparing table of the first embodiment power allocating apparatus 200 and the above-mentioned conventional switching power supply 100 operating under the normal operation mode. Please note that the main power supply module 202 has a total output power of 320 W (Watt) and auxiliary power supply module 204 has an output power of 15 W, and the total power comparing table is measured under the testing condition of 115 Vac/60 Hz. Accordingly, compared with the conventional switching power supply 100, the power allocating apparatus 200 of the present invention saves power of 0.6 W, 0.8 W, and 1.33 W when the loading conditions of the main power loading 212 are 20%, 50%, and 100%, respectively.

Please note that, although the configuration of the above-mentioned embodiments is constructed by a main power supply module in combination with a main power loading, and an auxiliary power supply module in combination with an auxiliary power loading, this is not meant to be a limitation of the present invention. After reading the description of the disclosed embodiments, those skilled in this art may utilize a plurality of power supply modules to implement the power allocating apparatus of the present invention through some appropriate modifications upon the disclosed embodiments as shown in FIG. 2, FIG. 4, FIG. 5, and FIG. 6., and this also belongs to the scope of the present invention.

Those skilled in the art will readily observe that numerous modifications and alterations of the device and method may be made while retaining the teachings of the invention.

What is claimed is:

1. A power allocating apparatus applied in a plurality of power supply modules, wherein the plurality of power supply modules are coupled to a plurality of loads via a plurality of power lines, respectively, the power allocating apparatus comprising:

a first switch element, having a first connecting terminal and a second connecting terminal coupled to a first output terminal of at least one of the plurality of power supply modules with a first power conversion rate and a second output terminal of at least one of the plurality of power supply modules with a second power conversion rate, respectively, for selectively allocating a power generated by the power supply module with the first power conversion rate to a predetermined number of loadings simultaneously according to on or off states of the first switch element; and a control device, coupled to the first switch element, for generating the control signal to control the first switch element to enter an on state or an off state;

wherein the first power conversion rate is higher than the second power conversion rate;

wherein the power supply module with the second power conversion rate is turned off when the first switch element is under the on state.

2. The power allocating apparatus of claim 1, wherein the first switch element is a bidirectional switch.

3. The power allocating apparatus of claim 1, further comprising:

a diode, having an anode coupled to the second output terminal of the power supply module with the second power conversion rate and a cathode coupled to the second connecting terminal of the first switch element.

4. The power allocating apparatus of claim 1, further comprising: a second switch element, coupled between the second output terminal of the power supply module with the second power conversion rate and the second connecting terminal of the first switch element, wherein the second switch element is not conductive when the first switch element is conductive.

5. The power allocating apparatus of claim 1, wherein the second switch element is a unidirectional switch.

6. The power allocating apparatus of claim 1, wherein the control device is a boost driving circuit, a buck-boost driving circuit, or a flyback driving circuit.

7. The power allocating apparatus of claim 1, wherein the control device comprises:

a driving circuit, for generating the control signal; and a timing control circuit, coupled to the driving circuit, for selectively outputting the control signal generated by the driving circuit according to an output signal generated by a power protection circuit.

8. The power allocating apparatus of claim 7, wherein the driving circuit is a boost driving circuit, a buck-boost driving circuit, or a flyback driving circuit.

9. The power allocating apparatus of claim 7, wherein the timing control circuit comprises:

a bipolar junction transistor (BJT), having a base terminal, an emitter terminal coupled to an output terminal of the driving circuit, and a collector terminal;

a first resistive element, coupled between the emitter terminal and the base terminal of the BJT;

a field effect transistor (FET), having a drain terminal, a source node coupled to a reference voltage, and a gate terminal coupled to the output signal; and a second resistive element, coupled between the base terminal of the BJT and the drain terminal of the FET.

10. The power allocating apparatus of claim 7, wherein the control device further comprises:

a detecting circuit, coupled to the timing control circuit and the first output terminal of the power supply module with the first power conversion rate, for detecting an output power generated by the power supply module with the first power conversion rate to selectively output the control signal generated by the timing control circuit to the first switch element.

11. The power allocating apparatus of claim 10, wherein the detecting circuit comprises:

a first BJT, having a base terminal, an emitter terminal coupled to an output terminal of the timing control circuit, and a collector terminal;

a first resistive element, coupled between the emitter terminal and the base terminal of the first BJT;

a second BJT, having a base terminal, a collector terminal, and an emitter terminal coupled to a reference voltage;

a second resistive element, coupled to the base terminal of the first BJT and the collector terminal of the second BJT;

a third resistive element, having a terminal coupled to the base terminal of the second BJT; and a zener diode, having an anode coupled to another terminal of the third resistive element, and a cathode coupled to the first output terminal of the power supply module with the first power conversion rate.

12. The power allocating apparatus of claim 1, wherein the control device comprises:

a driving circuit, for generating the control signal; and a detecting circuit, coupled to the driving circuit and the first output terminal of the power supply module with the first power conversion rate, for detecting an output power generated by the power supply module with the first power conversion rate to selectively output the control signal generated by the driving circuit to the first switch element.

13. The power allocating apparatus of claim 12, wherein the driving circuit is a boost driving circuit, a buck-boost driving circuit, or a flyback driving circuit.

14. The power allocating apparatus of claim 12, wherein the detecting circuit comprises:

a first BJT, having a base terminal, an emitter terminal coupled to an output terminal of the driving circuit, and a collector terminal;

a first resistive element, coupled between the emitter terminal and the base terminal of the first BJT;

a second BJT, having a base terminal, a collector terminal, and an emitter terminal coupled to a reference voltage;

a second resistive element, coupled to the base terminal of the first BJT and the collector terminal of the second BJT;

a third resistive element, having a terminal coupled to the base terminal of the second BJT; and a zener diode, having an anode coupled to another terminal of the third resistive element, and a cathode coupled to the first output terminal of the power supply module with the first power conversion rate.

* * * * *